(12) United States Patent
Kullman et al.

(10) Patent No.: US 9,445,389 B1
(45) Date of Patent: Sep. 13, 2016

(54) UTILIZATION OF RELAY NODES WITH BEAMFORMED COMMUNICATIONS

(71) Applicant: Sprint Communications Company L.P., Overland Park, KS (US)

(72) Inventors: Nicholas David Kullman, Seattle, WA (US); Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 419 days.

(21) Appl. No.: 14/163,563

(22) Filed: Jan. 24, 2014

(51) Int. Cl.
*H04W 24/00* (2009.01)
*H04W 64/00* (2009.01)
*H04B 7/15* (2006.01)

(52) U.S. Cl.
CPC .............. *H04W 64/003* (2013.01); *H04B 7/15* (2013.01)

(58) Field of Classification Search
CPC .............................. H04W 64/003; H04B 7/15
USPC ......... 455/456.1, 456.2, 456.3, 456.4, 456.5, 455/456.6, 457
See application file for complete search history.

(56) References Cited

U.S. PATENT DOCUMENTS

2010/0157845 A1* 6/2010 Womack .............. H04B 7/2606
370/254

FOREIGN PATENT DOCUMENTS

WO          2012125499          9/2012

* cited by examiner

*Primary Examiner* — Shahriar Behnamian

(57) ABSTRACT

A wireless communication device that receives wireless access from a wireless access node through a relay node associated with the wireless access node comprises a wireless communication transceiver and a processing system. The wireless communication transceiver is configured to receive communications of the wireless access node that are relayed by the relay node for delivery to the wireless communication device, wherein the relay node receives the communications over a beamformed communication transmitted by the wireless access node. The processing system is configured to process the communications to determine a request for a location of the wireless communication device for the wireless access, identify a location of the relay node, and responsive to the request for the location of the wireless communication device, report the location of the relay node instead of the location of the wireless communication device.

20 Claims, 5 Drawing Sheets

UTILIZATION OF RELAY NODES WITH BEAMFORMED COMMUNICATIONS

TECHNICAL BACKGROUND

Wireless communication devices transmit and receive information wirelessly via a wireless access node to communicate over a communication network. Typically, the wireless access node is part of a radio access network (RAN) which provides the wireless communication devices with access to further communication networks, systems, and devices. The wireless communication devices typically utilize "forward link" or "downlink" communication channels to receive voice and/or data transmitted from the wireless access node, and "reverse link" or "uplink" communication channels to transmit information up to the node.

In fourth generation (4G) long term evolution (LTE) communication systems, a wireless communication device is referred to as user equipment (UE), while a wireless access node is called an enhanced node B (eNodeB). In some situations, a relay node is also utilized to relay communications from an eNodeB to outlying UE devices that do not receive good coverage from the eNodeB but are within range of the relay node. Some eNodeBs utilize beamforming antennas, which steer the main beam of the antenna to cover specific individual UE devices momentarily. A beamforming antenna operates by locating an individual UE device, typically through its global positioning system (GPS) coordinates, manipulating phase differences of the outgoing signal on the antenna's elements, and thereby creating a traffic beam which provides optimal coverage to a specific UE.

OVERVIEW

A method of operating a wireless communication device that receives wireless access from a wireless access node through a relay node associated with the wireless access node comprises receiving communications of the wireless access node that are relayed by the relay node for delivery to the wireless communication device, wherein the relay node receives the communications over a beamformed communication transmitted by the wireless access node. The method further comprises, in the communications, receiving a request for a location of the wireless communication device for the wireless access. The method further comprises identifying a location of the relay node. The method further comprises, responsive to the request for the location of the wireless communication device, reporting the location of the relay node instead of the location of the wireless communication device.

A wireless communication device that receives wireless access from a wireless access node through a relay node associated with the wireless access node comprises a wireless communication transceiver and a processing system. The wireless communication transceiver is configured to receive communications of the wireless access node that are relayed by the relay node for delivery to the wireless communication device, wherein the relay node receives the communications over a beamformed communication transmitted by the wireless access node. The processing system is configured to process the communications to determine a request for a location of the wireless communication device for the wireless access, identify a location of the relay node, and responsive to the request for the location of the wireless communication device, report the location of the relay node instead of the location of the wireless communication device.

A computer apparatus to operate a wireless communication device that receives wireless access from a wireless access node through a relay node associated with the wireless access node comprises software instructions and at least one non-transitory computer-readable storage medium storing the software instructions. The software instructions are configured, when executed by the wireless communication device, to direct the wireless communication device to receive communications of the wireless access node that are relayed by the relay node for delivery to the wireless communication device, wherein the relay node receives the communications over a beamformed communication transmitted by the wireless access node, and in the communications, receive a request for a location of the wireless communication device for the wireless access. The software instructions are further configured to direct the wireless communication device to identify a location of the relay node, and responsive to the request for the location of the wireless communication device, report the location of the relay node instead of the location of the wireless communication device.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
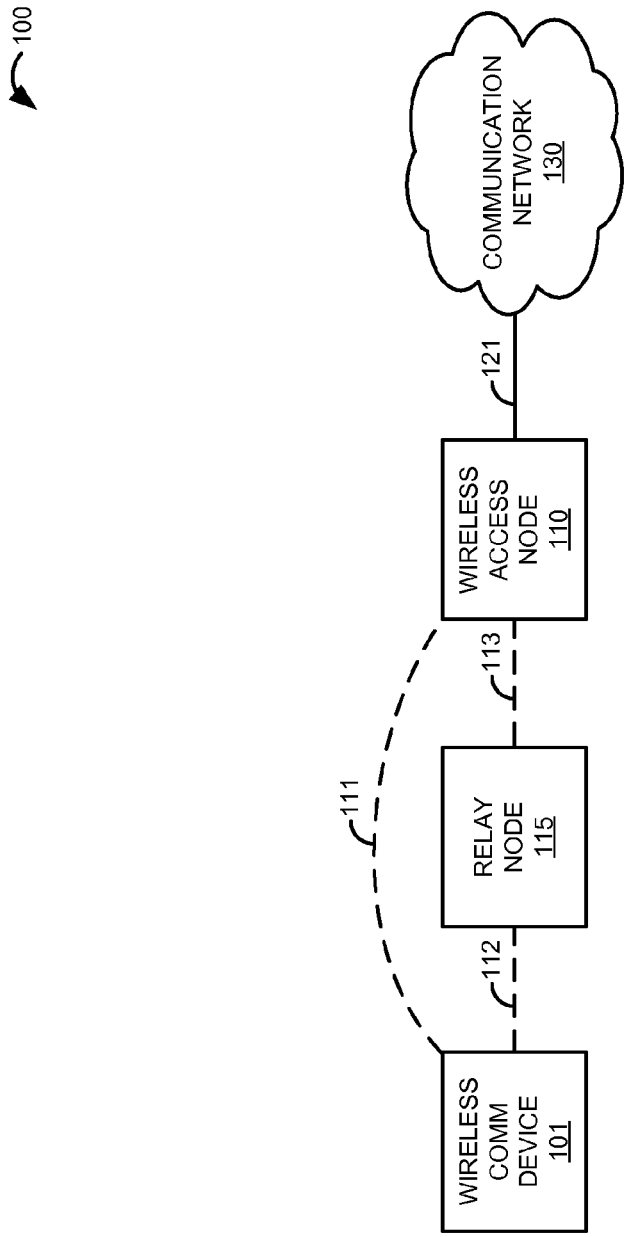
FIG. 1 is a block diagram that illustrates a communication system.

FIG. 1 is a block diagram that illustrates communication system 100. Communication system 100 includes wireless communication device 101, wireless access node 110, relay node 115, and communication network 130. Wireless communication device 101 and relay node 115 communicate over wireless communication link 112. Relay node 115 and wireless access node 110 are in communication over wireless communication link 113. In some examples, wireless communication device 101 and wireless access node 110 may communicate over wireless communication link 111. Wireless access node 110 and communication network 130 communicate over communication link 121.

Figure 2:
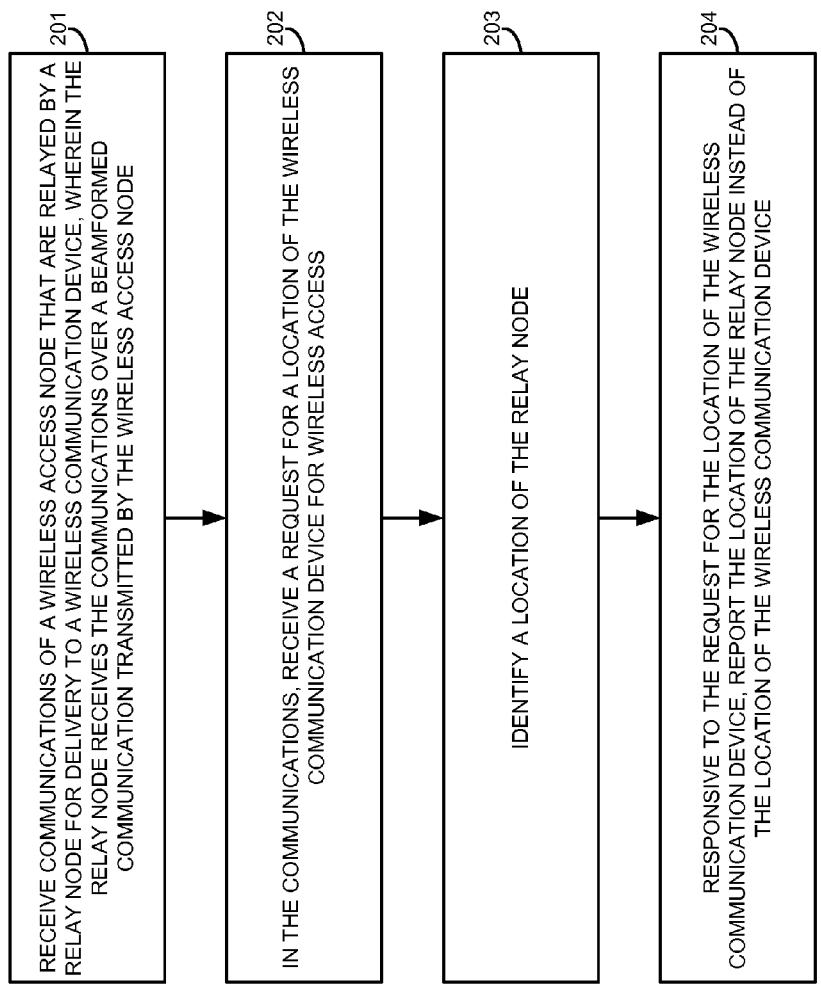
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed to operate wireless communication device 101 that receives wireless access from wireless access node 110 through relay node 115 associated with wireless access node 110.

As shown in the operational flow of FIG. 2, wireless communication device 101 receives communications of wireless access node 110 that are relayed by relay node 115 for delivery to wireless communication device 101, wherein relay node 115 receives the communications over a beamformed communication transmitted by wireless access node 110 (201). The communications could comprise any voice or data communications for wireless communication device 101, such as voice calls, streaming media, short message service (SMS) and multimedia message service (MMS) messages, web page content, downloaded files, and the like. In this example, wireless access node 110 and relay node 115 are in communication over a radio frequency (RF) backhaul link. In some examples, the RF backhaul link may be created using beamforming. A beamforming antenna is typically used to steer the antenna's main beam to cover a specific location. In this example, wireless access node 110 may employ a beamforming antenna to transmit the communications for delivery to relay node 115 over the beamformed communication. Typically, to transmit the communications for delivery to relay node 115 in the beamformed communication, wireless access node 110 locates relay node 115 through global positioning system (GPS) coordinates or some other location identifier, manipulates phase differences of the outgoing signal on the antenna's elements, and creates a traffic beam which provides optimal coverage to the specific area where relay node 115 is located. Once relay node 115 receives the communications over the beamformed communication transmitted by wireless access node 110, relay node 115 relays the communications for delivery to wireless communication device 101. In some examples, relay node 115 may communicate with wireless communication device 101 over a beamformed communication link as well.

In the communications, wireless communication device 101 receives a request for a location of wireless communication device 101 for wireless access (202). Typically, wireless communication device 101 receives the request for its location transmitted by wireless access node 110, either directly or via relay node 115. The location request may originate from wireless access node 110, relay node 115, or any other network element associated with communication network 130. Typically, the request for the location of wireless communication device 101 is sent pursuant to establishing and/or maintaining wireless access for wireless communication device 101 provided by wireless access node 110 through relay node 115. For example, wireless access node 110 may request the location of wireless communication device 101 when employing a beamforming antenna to target communications to specific devices or locations. Other reasons why wireless communication device 101 might receive the request for the location of wireless communication device 101 are possible and within the scope of this disclosure.

Wireless communication device 101 identifies a location of relay node 115 (203). Typically, relay node 115 transmits the location of relay node 115 for delivery to wireless communication device 101. In some examples, wireless communication device 101 identifies the location of relay node 115 by receiving the location of relay node 115 broadcast by relay node 115. For example, relay node 115 could be configured to broadcast its location in an overhead message, such as a primary synchronization signal (PSS), secondary synchronization signal (SSS), master information block (MIB), system information block (SIB), paging channel, resource assignment, or any other data message. In some examples, relay node 115 may continuously and/or periodically transmit the location of relay node 115, or may only transmit its location when relay node 115 detects that wireless access node 110 is employing beamforming. For example, upon receiving the beamformed communication transmitted by wireless access node 110, relay node 115 may commence broadcasting its location. The location of relay node 115 could be expressed in any format, such as global positioning system (GPS) coordinates or any other suitable location identifier.

Responsive to the request for the location of wireless communication device 101, wireless communication device 101 reports the location of relay node 115 instead of the location of wireless communication device 101 (204). Wireless communication device 101 may transmit the location of relay node 115 directly to wireless access node 110 or via relay node 115 in some examples. After receiving the location of relay node 115 instead of the location of wireless communication device 101, wireless access node 110 may transmit data for delivery to wireless communication device 101 in beamformed communications directed at the location of relay node 115 that was reported by wireless communication device 101. In some examples, wireless access node 110 may pool traffic at relay node 115 for a plurality of wireless communication devices (not shown) that all report the location of relay node 115 responsive to requests for their locations. Wireless access node 110 could leave the main beam of its antenna focused on the location of relay node 115 for a longer duration as the number of wireless communication devices that reported the location of relay node 115 increases in some examples.

Advantageously, wireless communication device 101 reports the location of relay node 115 instead of its own location upon request from wireless access node 110 engaged in beamforming communications. By receiving the location of relay node 115 in response to requesting the location of wireless communication device 101, wireless access node 110 may transmit communications for delivery to wireless communication device 101 by directing the antenna beam at the location of relay node 115 that was reported by wireless communication device 101 instead of the actual location of wireless communication device 101. In this manner, wireless communication device 101 will receive the intended communications as relayed by relay node 115, instead of possibly missing the communications if wireless access node 110 had attempted to use beamforming to deliver the communications directly to wireless communication device 101 at its actual location, which may be out of range of wireless access node 110.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110 and/or relay node 115.

Wireless access node 110 and relay node 115 each individually comprise RF communication circuitry and an antenna. The RF communication circuitry typically includes an amplifier, filter, RF modulator, and signal processing circuitry. Wireless access node 110 and relay node 115 may also comprise a router, server, memory device, software, processing circuitry, cabling, power supply, network communication interface, structural support, or some other communication apparatus. Wireless access node 110 and relay node 115 could each comprise a base station, Internet access node, telephony service node, wireless data access point, or some other wireless communication system—including combinations thereof. Some examples of wireless access node 110 and relay node 115 include a base transceiver station (BTS), base station controller (BSC), radio base station (RBS), Node B, enhanced Node B (eNodeB), and others—including combinations thereof. Wireless network protocols that may be utilized by wireless access node 110 and relay node 115 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Wireless communication links 111-113 use the air or space as the transport medium. Wireless communication links 111-113 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication links 111-113 may each individually comprise many different signals sharing the same link. For example, each wireless communication link 111-113 could include multiple signals operating in a single propagation path comprising multiple communication sessions, frequencies, timeslots, transportation ports, logical transportation links, network sockets, IP sockets, packets, or communication directions—including combinations thereof. In some examples, wireless communication links 111-113 could comprise beamformed communication links.

Communication link 121 uses metal, air, space, optical fiber such as glass or plastic, or some other material as the transport medium—including combinations thereof. Communication link 121 could use various communication protocols, such as TDM, IP, Ethernet, telephony, optical networking, hybrid fiber coax (HFC), communication signaling, wireless protocols, or some other communication format—including combinations thereof. Communication link 121 may be a direct link or could include intermediate networks, systems, or devices.

Figure 3:
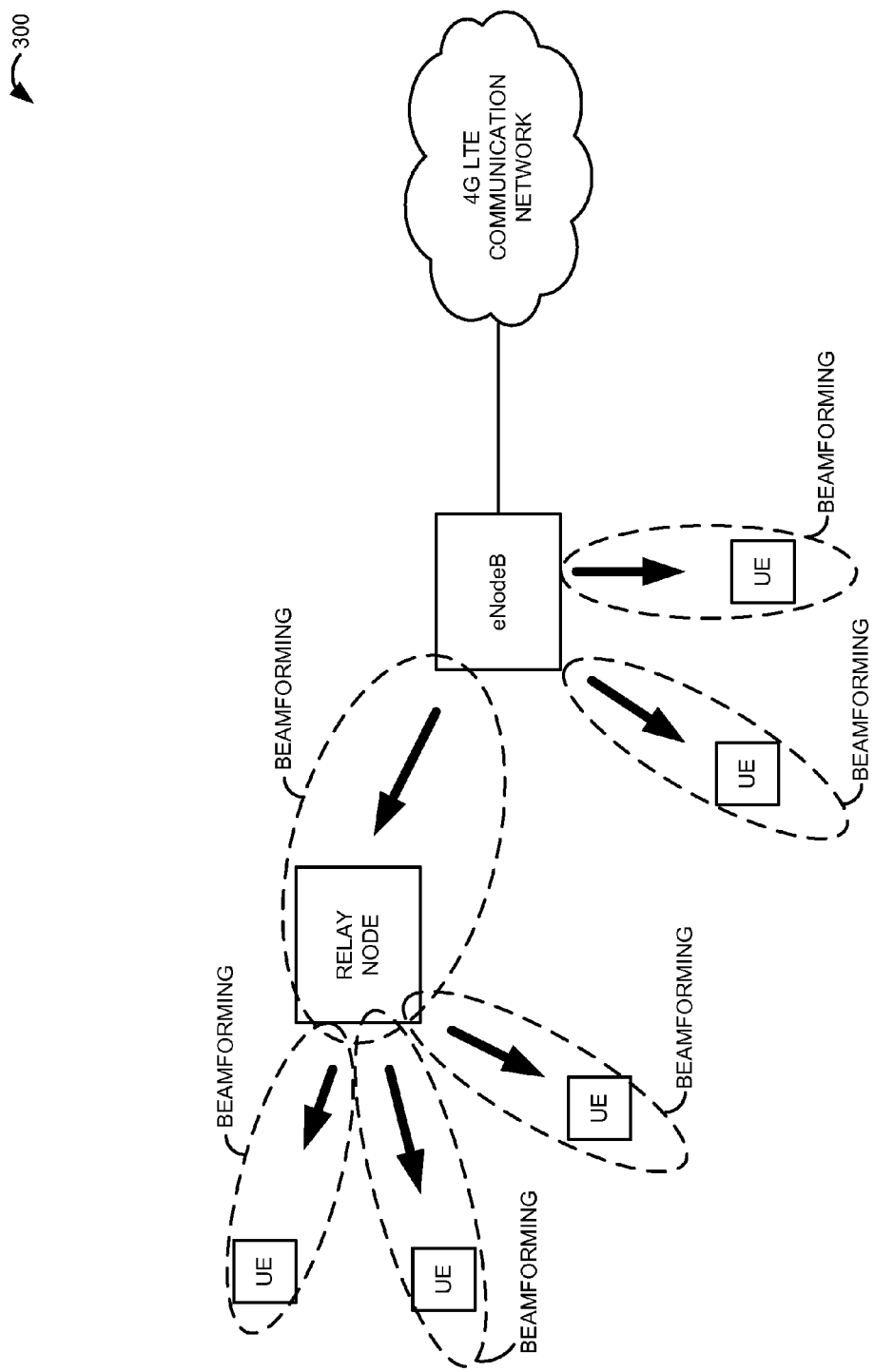
FIG. 3 is a block diagram that illustrates a communication system in an exemplary embodiment.

FIG. 3 is a block diagram that illustrates long term evolution (LTE) communication system 300 in an exemplary embodiment. LTE communication system 300 includes an enhanced Node B (eNodeB) base station that is in communication with the 4G LTE communication network. The eNodeB base station provides an example of wireless access node 110, although wireless access node 110 may use alternative configurations. The 4G LTE communication network could include a mobility management entity (MME), serving gateway (SGW), packet data network gateway (PGW), and other network elements typically found in a 4G LTE communication network. LTE communication system 300 also includes several user equipment (UE) devices and a relay node. The UEs provide examples of wireless communication device 101, although device 101 could use alternative configurations. Likewise, the relay node provides an example of relay node 115, although relay node 115 may use alternative configurations. Three of the UEs are shown as being served by the eNodeB base station via the relay node, while two of the UEs are served directly by the eNodeB.

In this example, both the relay node and the eNodeB are engaged in beamforming communications as shown by the dotted lines encircling the UEs and the relay node. Each of the beamformed communication channels provide a wireless coverage area with an approximate boundary as indicated by the dotted line encircling it, which is typically defined by the signal propagation characteristics and coverage capabilities of the eNodeB and the relay node. In order to provide forward link communication channels, the eNodeB tunes its main beam to cover the relay node and the two UEs located below the eNodeB. Note that the eNodeB would not typically be capable of providing beamformed communications to both of these UEs and the relay node simultaneously, but would cycle through these three locations individually by periodically focusing the beam on the separate locations of each UE and the relay node. The two UEs that are served directly by the eNodeB are in communication with the eNodeB over reverse link communication channels that are not shown for clarity. Likewise, the relay node communicates with the eNodeB over a reverse link communication channel, which may be a typical RF communication link or may comprise beamformed communications transmitted by the relay node back to the eNodeB in some examples.

The relay node is also engaged in providing forward link communication channels to three other UEs. In this example, the relay node receives data for the UEs transmitted from the eNodeB and relays this data to the appropriate UE using beamforming in the forward link direction. Again, although the relay node is shown as providing beamformed communications to the three UEs it is serving, this would not typically occur simultaneously. Instead, the relay node would cycle through each UE individually by continuously steering the main beam of its antenna from UE to UE. The three UEs that are served by the relay node are in communication with the relay node over reverse link communication channels that are not shown for clarity. An exemplary operation of LTE communication system 300 will now be discussed with respect to FIG. 4.

Figure 4:
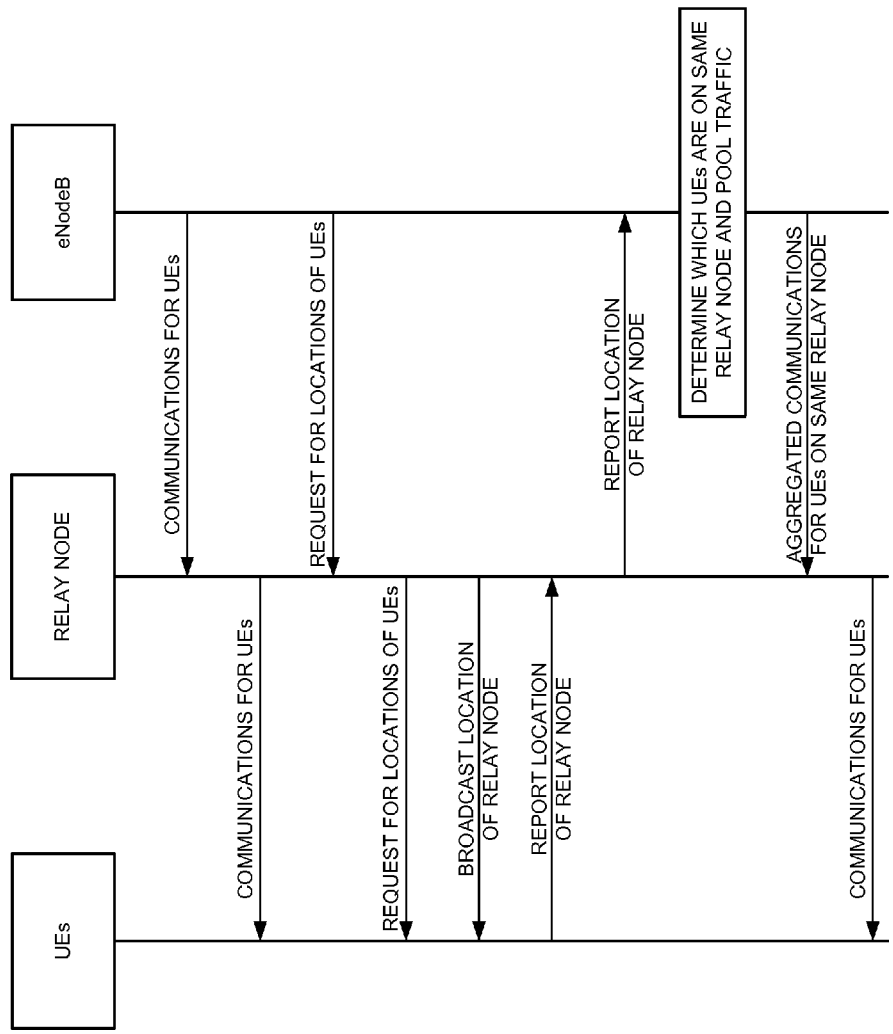
FIG. 4 is a sequence diagram that illustrates an operation of a communication system in an exemplary embodiment.

FIG. 4 is a sequence diagram that illustrates an operation of LTE communication system 300. In this example, the eNodeB receives communications for the UEs and transmits the communications to the relay node using beamforming, and the relay node relays these communications for ultimate delivery to the UEs it is serving. Because the eNodeB is engaged in beamforming, the eNodeB transfers requests for the locations of each of the UEs so that it can specifically target the beam on each of the UEs at their respective locations. The requests for the locations of the two UEs that are served directly by the eNodeB return their actual locations in response to this query (not shown in FIG. 4). The eNodeB is then able to target each of these two UEs individually in separate beamformed communications that are periodically directed at each of these UEs.

Since the eNodeB requests the locations of each UE with the goal of targeting its beam on each UE individually, a downfall of this dynamic traffic beam is that when a relay node is needed to reach outlying UEs that are not within range of the eNodeB, the relay node may not consistently receive the traffic coverage required for it to serve all the UEs in its coverage area. To address this problem, the relay node receives the requests for the locations of the three UEs it is serving and transmits the requests to their intended destination devices. Before, during, or after relaying the requests, the relay node broadcasts its GPS coordinates in an overhead message. The UEs are configured to look for and recognize the overhead message transmitted by the relay node and extract the GPS location of the relay node. In response to the requests for their locations, the UEs are configured to return the location of the relay node that is serving them instead of their own locations as requested by the eNodeB. For example, the UEs could detect that they are being served by a relay node in overhead messages transmitted by the relay node, determine that the eNodeB is requesting their locations to facilitate beamforming, and responsively return the location of the serving relay node instead of their own locations. The relay node relays this location information back to the eNodeB.

When the eNodeB receives the same location of the relay node from the three UEs that are served by the relay node, the eNodeB recognizes that these three UEs are receiving service from the same relay node. In this example, the eNodeB determines which of the UEs are on the same relay node and pools their traffic together for more efficient delivery of the communications intended for receipt by these three UEs. The eNodeB then transmits the aggregated communications for the three UEs served by the relay node to the relay node in a beamformed communication, and the relay node in turn provides the communications to the appropriate UE in individual beamformed communications for each of the UEs. In some examples, the eNodeB could leave the beam focused on the relay node for a longer duration than on the individual UEs in range of the eNodeB that are not in communication with the relay node. For example, the eNodeB could target its beam on each of the individual UEs it is serving for one second each, and then linger the beam on the relay node for three seconds to help provide enough timeslots to transmit the aggregated data in a bulk transmission for the three UEs served by the relay node. The length of time that the eNodeB maintains the beamformed communication link on the relay node could increase as the number of UEs attached to the relay node increases.

In some examples, the eNodeB may provide two separate beams with its antenna. For example, the eNodeB could provide a wide beam for overhead information such as synchronization, paging, and resource assignment, and a narrow beam carrying user traffic for the UEs. The wide beam typically has a far enough reach to cover the relay node, and the narrow beam may be moved from UE to UE to provide user data specific to each UE. However, if the narrow beam were not pointed at the relay node, then a UE that is communicating with the relay node but is out of range of the eNodeB would not receive its user traffic. This problem could be alleviated by broadcasting user traffic for UEs that report their location as the location of the relay node in the wide beam which covers the relay node. In this manner, the relay node can receive the user traffic for the UEs it is serving in the wide beam broadcast, and then separate and retransmit the user traffic to the appropriate destination devices.

Advantageously, the techniques described above ensure that the UEs that receive their coverage through a relay node will continue to receive their intended communications when an eNodeB associated with the relay node is engaged in beamforming. In particular, the UEs covered by the relay node will alter their location reporting to report the GPS coordinates of the relay node instead of their actual locations. This will cause the traffic beam from the antenna of the eNodeB to be routed to the relay and thus provide the UEs on the relay node their intended traffic. If this technique is not implemented, the downlink signal of the eNodeB may not reach the UEs that are being served by the relay node. However, when implemented, data is delivered to the appropriate UEs via the relay node, thereby improving system performance and enhancing user experience.

Figure 5:
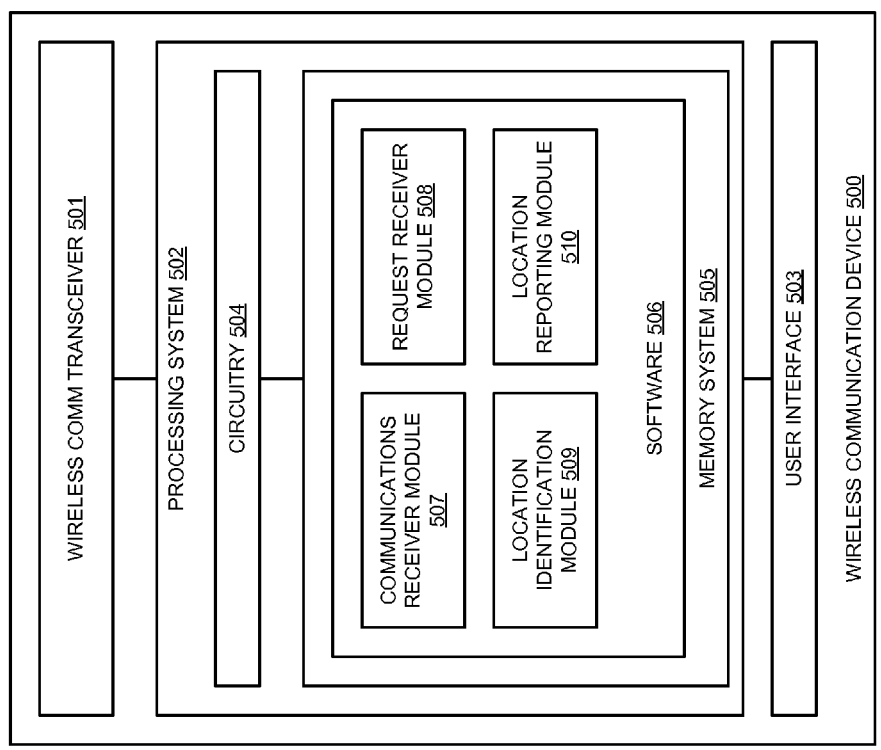
FIG. 5 is a block diagram that illustrates a wireless communication device.

FIG. 5 is a block diagram that illustrates wireless communication device 500. Wireless communication device 500 provides an example of wireless communication device 101, although device 101 could use alternative configurations. Wireless communication device 500 comprises wireless communication transceiver 501, processing system 502, and user interface 503. Processing system 502 is linked to wireless communication transceiver 501 and user interface 503. Processing system 502 includes processing circuitry 504 and memory system 505 that stores operating software 506. Operating software 506 comprises software modules 507-510. Wireless communication device 500 may include other well-known components such as a battery and enclosure that are not shown for clarity. Wireless communication device 500 may comprise a telephone, computer, e-book, mobile Internet appliance, media player, game console, wireless network interface card, or some other wireless communication apparatus—including combinations thereof.

Wireless communication transceiver 501 comprises RF communication circuitry and an antenna. The RF communication circuitry typically includes an amplifier, filter, RF modulator, and signal processing circuitry. Wireless communication transceiver 501 may also include a memory system, software, processing circuitry, or some other communication device. Wireless communication transceiver 501 may use various protocols, such as CDMA, GSM, UMTS, HSPA, EV-DO, EV-DO rev. A, 3GPP LTE, LTE Advanced, WiMAX, Wi-Fi, Bluetooth, Internet, telephony, or some other wireless communication format. Wireless communication transceiver 501 is configured to receive communications of a wireless access node that are relayed by a relay node for delivery to wireless communication device 500, wherein the relay node receives the communications over a beamformed communication transmitted by the wireless access node. Wireless communication transceiver 501 may also be configured to, responsive to a request for a location of wireless communication device 500, report a location of the relay node instead of the location of wireless communication device 500.

User interface 503 comprises components that interact with a user to receive user inputs and to present media and/or information. User interface 503 may include a speaker, microphone, buttons, lights, display screen, touchscreen, touch pad, scroll wheel, communication port, or some other user input/output apparatus—including combinations thereof. User interface 503 may be omitted in some examples.

Processing circuitry 504 comprises microprocessor and other circuitry that retrieves and executes operating software 506 from memory system 505. Processing circuitry 504 may comprise a single device or could be distributed across multiple devices—including devices in different geographic areas. Processing circuitry 504 may be embedded in various types of equipment. Processing circuitry 504 is typically mounted on a circuit board that may also hold memory system 505 and portions of wireless communication transceiver 501 and user interface 503. Memory system 505 comprises a non-transitory computer readable storage medium, such as a disk drive, flash drive, data storage circuitry, or some other hardware memory apparatus. Memory system 505 may comprise a single device or could be distributed across multiple devices—including devices in different geographic areas. Memory system 505 may be embedded in various types of equipment. In some examples, a computer apparatus could comprise memory system 505 and operating software 506. Operating software 506 comprises computer programs, firmware, or some other form of machine-readable processing instructions. Operating software 506 may include an operating system, utilities, drivers, network interfaces, applications, or some other type of software. In this example, operating software 506 comprises software modules 507-510, although software 506 could have alternative configurations in other examples.

When executed by processing circuitry 504, operating software 506 directs processing system 502 to operate wireless communication device 500 as described herein for wireless communication device 101. In particular, operating software 506 directs processing system 502 to direct wireless communication transceiver 501 to receive communications of a wireless access node that are relayed by a relay node for delivery to wireless communication device 500, wherein the relay node receives the communications over a beamformed communication transmitted by the wireless access node. Operating software 506 further directs processing system 502 to process the communications to determine a request for a location of wireless communication device 500 for wireless access. In addition, operating software 506 directs processing system 502 to identify a location of the relay node. Finally, operating software 506 directs processing system 502 to, responsive to the request for the location of wireless communication device 500, report the location of the relay node instead of the location of wireless communication device 500.

In this example, operating software 506 comprises a communications receiver software module 507 that receives communications of a wireless access node that are relayed by a relay node for delivery to wireless communication device 500, wherein the relay node receives the communications over a beamformed communication transmitted by the wireless access node. Additionally, operating software 506 comprises a request receiver software module 508 that, in the communications, receives a request for a location of the wireless communication device for the wireless access. Operating software 506 also comprises a location identification software module 509 that identifies a location of the relay node. Finally, operating software 506 comprises a location reporting software module 510 that, responsive to the request for the location of wireless communication device 500, reports the location of the relay node instead of the location of wireless communication device 500.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device that receives wireless access from a wireless access node through a relay node associated with the wireless access node, the method comprising:
   receiving communications of the wireless access node that are relayed by the relay node for delivery to the wireless communication device, wherein the relay node receives the communications over a beamformed communication transmitted by the wireless access node;
   in the communications, receiving a request for a location of the wireless communication device for the wireless access;
   identifying a location of the relay node; and
   responsive to the request for the location of the wireless communication device, reporting the location of the relay node instead of the location of the wireless communication device.

2. The method of claim 1 wherein the wireless access node transmits data for delivery to the wireless communication device in beamformed communications directed at the location of the relay node that was reported by the wireless communication device.

3. The method of claim 1 wherein the wireless access node and the relay node are in communication over a radio frequency (RF) backhaul link.

4. The method of claim 3 wherein the RF backhaul link is created using beamforming.

5. The method of claim 1 wherein the relay node communicates with the wireless communication device over a beamformed communication link.

6. The method of claim 1 wherein identifying the location of the relay node comprises receiving the location of the relay node broadcast by the relay node.

7. The method of claim 1 wherein the wireless access node pools traffic at the relay node for a plurality of wireless communication devices that all report the location of the relay node responsive to requests for their locations.

8. A wireless communication device that receives wireless access from a wireless access node through a relay node associated with the wireless access node, the wireless communication device comprising:
- a wireless communication transceiver configured to receive communications of the wireless access node that are relayed by the relay node for delivery to the wireless communication device, wherein the relay node receives the communications over a beamformed communication transmitted by the wireless access node; and
- a processing system configured to process the communications to determine a request for a location of the wireless communication device for the wireless access, identify a location of the relay node, and responsive to the request for the location of the wireless communication device, report the location of the relay node instead of the location of the wireless communication device.

9. The wireless communication device of claim 8 wherein the wireless access node transmits data for delivery to the wireless communication device in beamformed communications directed at the location of the relay node that was reported by the wireless communication device.

10. The wireless communication device of claim 8 wherein the wireless access node and the relay node are in communication over a radio frequency (RF) backhaul link.

11. The wireless communication device of claim 10 wherein the RF backhaul link is created using beamforming.

12. The wireless communication device of claim 8 wherein the relay node communicates with the wireless communication device over a beamformed communication link.

13. The wireless communication device of claim 8 wherein the processing system configured to identify the location of the relay node comprises the processing system configured to direct the wireless communication transceiver to receive the location of the relay node broadcast by the relay node.

14. The wireless communication device of claim 8 wherein the wireless access node pools traffic at the relay node for a plurality of wireless communication devices that all report the location of the relay node responsive to requests for their locations.

15. A computer apparatus to operate a wireless communication device that receives wireless access from a wireless access node through a relay node associated with the wireless access node, the apparatus comprising:
- software instructions configured, when executed by the wireless communication device, to direct the wireless communication device to receive communications of the wireless access node that are relayed by the relay node for delivery to the wireless communication device, wherein the relay node receives the communications over a beamformed communication transmitted by the wireless access node, and in the communications, receive a request for a location of the wireless communication device for the wireless access;
- the software instructions further configured to direct the wireless communication device to identify a location of the relay node, and responsive to the request for the location of the wireless communication device, report the location of the relay node instead of the location of the wireless communication device; and
- at least one non-transitory computer-readable storage medium storing the software instructions.

16. The computer apparatus of claim 15 wherein the wireless access node transmits data for delivery to the wireless communication device in beamformed communications directed at the location of the relay node that was reported by the wireless communication device.

17. The computer apparatus of claim 15 wherein the wireless access node and the relay node are in communication over a radio frequency (RF) backhaul link.

18. The computer apparatus of claim 15 wherein the RF backhaul link is created using beamforming.

19. The computer apparatus of claim 15 wherein the relay node communicates with the wireless communication device over a beamformed communication link.

20. The computer apparatus of claim 15 wherein the software instructions configured to direct the wireless communication device to identify the location of the relay node comprises the software instructions configured to direct the wireless communication device to receive the location of the relay node broadcast by the relay node.

* * * * *